(12) United States Patent
Djordjevic et al.

(10) Patent No.: US 8,175,466 B2
(45) Date of Patent: May 8, 2012

(54) METHODS AND SYSTEMS FOR POLARIZATION MULTIPLEXED MULTILEVEL MODULATION FOR OPTICAL COMMUNICATION

(75) Inventors: Ivan B. Djordjevic, Tucson, AZ (US);
Lybomir L. Minkov, Akron, OH (US);
Lei Xu, Princeton Junction, NJ (US);
Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 473 days.

(21) Appl. No.: 12/535,329

(22) Filed: Aug. 4, 2009

(65) Prior Publication Data

US 2010/0232804 A1 Sep. 16, 2010

Related U.S. Application Data

(60) Provisional application No. 61/158,939, filed on Mar. 10, 2009.

(51) Int. Cl.
*H04B 10/06* (2006.01)
*H04J 14/06* (2006.01)
(52) U.S. Cl. .......................... 398/202; 398/65; 398/205
(58) Field of Classification Search .................... 398/65, 398/202, 205
See application file for complete search history.

(56) References Cited

U.S. PATENT DOCUMENTS

| 8,006,163 | B2 * | 8/2011 | Djordjevic et al. | ........... 714/758 |
|---|---|---|---|---|
| 2006/0285852 | A1 * | 12/2006 | Xi et al. | ........... 398/141 |
| 2007/0092259 | A1 * | 4/2007 | Bontu et al. | ........... 398/147 |
| 2007/0092260 | A1 * | 4/2007 | Bontu et al. | ........... 398/152 |
| 2009/0052907 | A1 * | 2/2009 | Batshon et al. | ........... 398/182 |
| 2009/0235143 | A1 * | 9/2009 | Djordjevic et al. | ........... 714/752 |
| 2009/0257755 | A1 * | 10/2009 | Buelow | ........... 398/184 |
| 2009/0297144 | A1 * | 12/2009 | Djordevic et al. | ........... 398/39 |
| 2010/0050048 | A1 * | 2/2010 | Djordjevic et al. | ........... 714/755 |
| 2010/0196009 | A1 * | 8/2010 | Qian et al. | ........... 398/65 |
| 2010/0215371 | A1 * | 8/2010 | Djordevia et al. | ........... 398/79 |

OTHER PUBLICATIONS

Djordjevic, I., et al. Alamouti-Type Polarization-Time Coding in Coded-Modulation Schemes With Coherent Detection. Optics Express. vol. 16, No. 18. Aug. 2008. pp. 14163-14172. http://www.ece.arizona.edu/~ivan/OE_Aug_08_Alamouti.pdf.

Djordjevic, I., et al, PMD Compensation in Multilevel Coded-Modulation Schemes With Coherent Detection Using Blast Algorithm and Iterative Polarization Cancellation. vol. 16, No. 18. Sep. 2008. pp. 14845-14852. http://www.ece.arizona.edu/~ivan/OE_BLAST_Sept08.pdf.

Minkov, L., et al. Demonstration of PMD Compensation by LDPC-Coded Turbo Equalization and Channel Capacity Loss Characterization Due to PMD and Quantization. 2007 IEEE. IEEE Photonics Technology Letters. vol. 19, No. 22, Nov. 2007. pp. 1852-1854. http://www.ece.arizona.edu/~ivan/PTL_Nov_2007_LDPC_TE_PMD.pdf.

(Continued)

*Primary Examiner* — Nathan Curs
(74) *Attorney, Agent, or Firm* — Joseph Kolodka; James Bitetto

(57) ABSTRACT

Multilevel soft-equalizer detectors, such as a maximum a posteriori probability (MAP) detector, suitable for use in polarization multiplexed optical communications using multilevel modulations and coherent detection are disclosed. Detection systems and methods may consider two symbols transmitted over two orthogonal polarization states as a two-component symbol, which is effective in eliminating the bit error ratio (BER) floor phenomenon introduced by conventional soft equalizers.

20 Claims, 5 Drawing Sheets

OTHER PUBLICATIONS

Shieh, W., et al. Theoretical and Experimental Study on PMD-Supported Transmission Using Polarization Diversity in Coherent Optical OFDM Systems. Optics Express 15. Jul. 2007. vol. 15, No. 16. pp. 9936-9947. http://www.ee.unimelb.edu.au/staff/wshieh/CO_MIMO_OFDM.pdf.

Sun, H., et al. Real-Time Measurements of a 40 GB/S Coherent System. Optics Express 16. Jan. 2008. vol. 16, No. 2. pp. 873-879, http://www.opticsinfobase.org/DirectPDFAccess/A9191B24-BDB9-137E-CD878AD510F9D61E__148809.pdf?da=1&id=148809&seq=0&CFID=49751422&CFTOKEN=31969001.

* cited by examiner

METHODS AND SYSTEMS FOR POLARIZATION MULTIPLEXED MULTILEVEL MODULATION FOR OPTICAL COMMUNICATION

RELATED APPLICATION INFORMATION

This application claims priority to provisional application Ser. No. 61/158,939 filed on Mar. 10, 2009, incorporated herein by reference.

BACKGROUND

1. Technical Field

The present invention relates to transmission of information over an optical medium, and more particularly, to methods and systems that compensate for non-linear fiber-optics channel impairments.

2. Description of the Related Art

Service diversity, network functionalities, and transport capacities of photonics-enabled telecommunications have increased tremendously in recent years. Optical transmission at 100 Gb/s per wavelength has been under consideration and planning by network operators. At 100 Gb/s, optical fiber communications with conventional technologies face the technical challenges of strong signal degradation caused by transmission impairments, such as intra- and inner-channel nonlinearities, nonlinear phase noise and polarization-mode dispersion (PMD). In order to mitigate the signal distortions at ultra-high bit rates, some new technologies have been proposed and deployed in optical systems, and they represent a distinctive new trend in optical fiber communications. These new technologies include digital signal processing (DSP)-aided optical channel equalization, digital coherent reception, multilevel modulation formats and optical polarization multiplexing (or optical multiple input multiple output technologies).

SUMMARY

Although new compensation schemes have been proposed, many problems associated with degradation caused by channel impairments have not been adequately addressed. For example, conventional soft-equalizers, such as maximum a posteriori (MAP) probability equalizers, which have been proposed for use in high-speed optical communications, currently contend with a bit-error floor phenomenon. These conventional soft-equalizers employ transmission impairment compensation schemes that consider symbols transmitted over separate polarizations independently. In particular, current schemes for impairment compensation try to restore the original orthogonality of symbols transmitted over different polarizations.

In contrast to known impairment compensation schemes, exemplary embodiments of the present invention consider independent symbols transmitted in two orthogonal polarization states as a single, distinct symbol in a discrete dynamic channel with memory model to reduce the effects of PMD and other sources of error. It can be shown that the bit error ratio floor phenomenon can be eliminated by considering symbols transmitted over separate polarizations as components of a single super-symbol or symbol vector to detect received signals in accordance with exemplary embodiments of the present invention.

One exemplary embodiment of the present invention is directed to a method for detecting polarization multiplexed multilevel modulated signals including receiving the signals from an optical fiber medium; processing the signals with a soft equalizer by employing symbol vectors of a discrete dynamic channel with memory model, wherein two orthogonal components of at least one symbol vector are symbols that are respectively transmitted over different polarization states; and determining a transmitted symbol vector sequence from a received symbol vector sequence based on said processing.

An alternative exemplary embodiment of the present invention is directed to a system for transmitting polarization multiplexed multilevel modulated signals including a transmitter configured to receive a bit stream, to map bits to symbol vectors, each symbol vector including two orthogonal component symbols, and to transmit said component symbols over different, respective polarization states of modulated signals on an optical fiber medium; and a receiver configured to receive and process the signals in accordance with a soft equalization scheme by employing a discrete dynamic channel with memory model, which utilizes said symbol vectors, to determine a transmitted symbol vector sequence and thereby obtain the bit stream.

Another exemplary embodiment of the present invention is directed to a receiver device for processing polarization multiplexed multilevel modulated signals received on an optical fiber medium including at least one optical detector configured to perform electro-optical conversion and generate input samples from said signals; and a soft equalizer configured to process said input samples by employing symbol vectors of a discrete dynamic channel with memory model, wherein two orthogonal components of at least one symbol vector are symbols that are respectively transmitted over different polarization states and configured to determine a transmitted symbol vector sequence from a received symbol vector sequence based on said processing.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
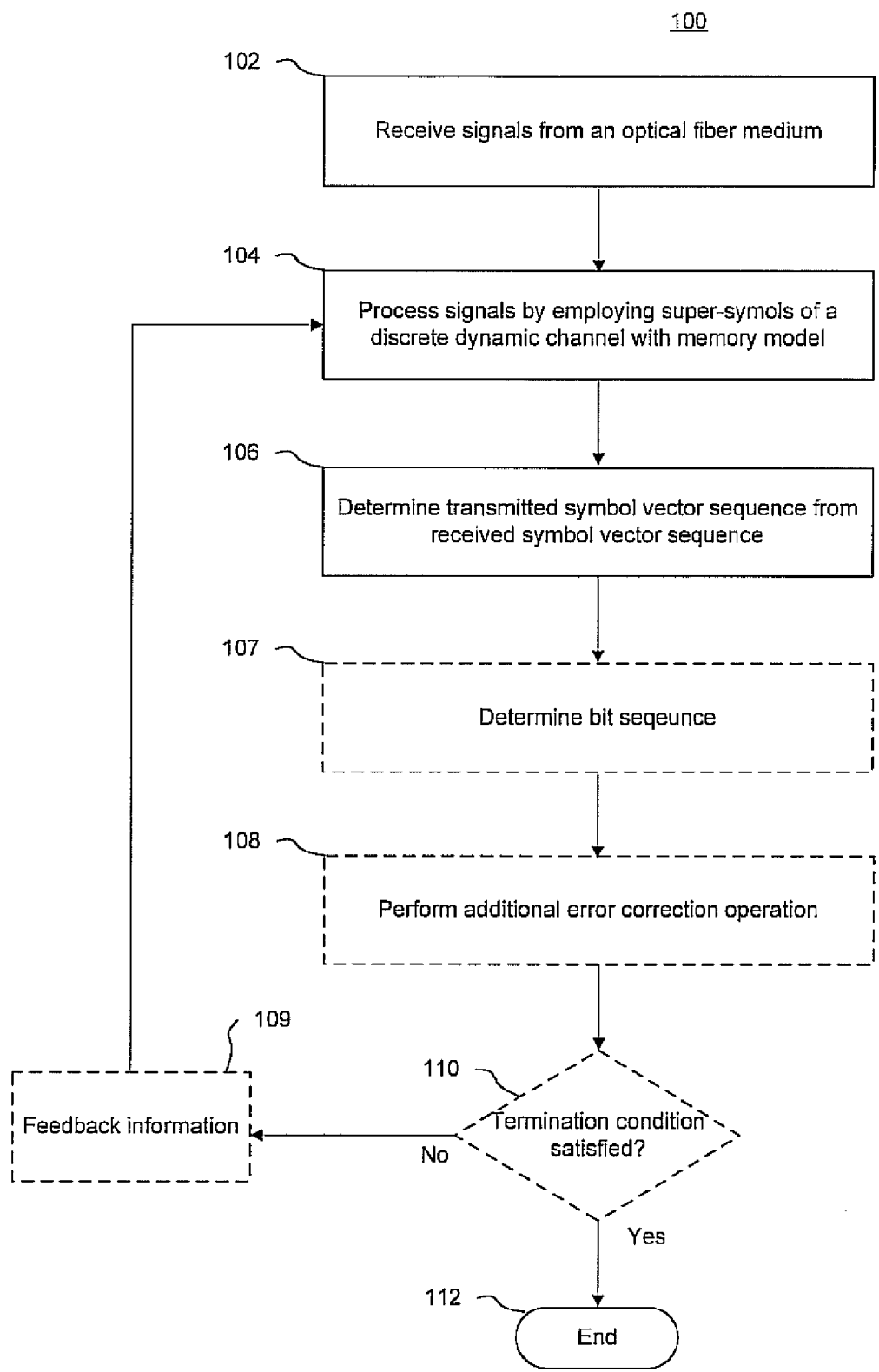
FIG. 1 is a block/flow diagram of a method for detecting polarization multiplexed multilevel modulated signals in accordance with one exemplary embodiment of the present invention.

As mentioned above, in accordance with exemplary implementations of the present invention, multiple symbols transmitted over different respective polarization states may be considered as separate components of a single symbol vector or "super-symbol" to reduce the effects of polarization mode dispersion in addition to other sources of errors.

According to one exemplary embodiment described herein below, a MAP detector suitable for use in polarization multiplexed optical communications using multilevel modulations and coherent detection may be configured to utilize "super-symbols" during signal processing. The multilevel MAP detection scheme may consider two symbols transmitted over two orthogonal polarization states as a two-component symbol. However, it should be understood that the concepts disclosed herein may be generalized to super-symbols having more than two symbols transmitted over corresponding polarization states in view of the descriptions disclosed herein. It should also be understood that although exemplary embodiments of the present invention are described using a MAP multilevel equalizer, embodiments of the present invention may be implemented with other soft equalizers by those of ordinary skill in the art in view of the teachings disclosed herein. Examples of other soft equalizers include an equalizer based on a sum-product algorithm approximation and a Monte Carlo equalizer.

It can be demonstrated experimentally that the MAP scheme described herein below is effective in completely eliminating the bit error ratio (BER) floor phenomenon introduced by conventional MAP equalizers, which consider the symbols transmitted over different polarizations independently. To improve further tolerance to optical fiber PMD, extrinsic soft information between an MAP detector and a soft-iterative decoder may be iterated in a turbo equalization fashion. It can be shown that a penalty of less than 1.5 dB at 20 Gb/s (and BER of $10^{-6}$) for differential group deal (DGD) of 100 ps can be achieved.

The exemplary multilevel MAP probability turbo equalization scheme described below may be based on a multilevel Bahl-Cocke-Jelinek-Raviv (BCJR) Equalizer, referred to herein as a multilevel BCJR equalizer, and a soft-iterative decoder. The scheme is suitable for PMD compensation in polarization multiplexed optical communication systems using multilevel modulations and coherent detection. The multilevel BJCR equalizer may serve as a nonlinear intersymbol interference (ISI) equalizer and may provide soft symbol log-likelihood ratios (LLRs), which may be used in a soft-decoding process as discussed more fully below.

As mentioned above, the scheme may consider the independent symbols transmitted in two orthogonal polarization states as a super-symbol, which is a symbol vector composed of two components, corresponding to two orthogonal polarization states. The multilevel turbo equalizer is universal and applicable to any two-dimensional signal constellation such as M-ary phase-shift keying (PSK), M-ary quadrature amplitude modulation (QAM) or M-ary pulse-amplitude modulation (PAM), and both coherent and direct detections. The scheme can be used in combination with an arbitrary soft-decoding process.

Referring now in detail to the figures in which like numerals represent the same or similar elements and initially to FIG. 1, a method 100 for detecting polarization multiplexed multilevel modulated signals in accordance with one exemplary embodiment of the present invention is illustrated. Method 100 may begin at step 102 in which the polarization multiplexed signals may be received by a receiver device on an optical fiber medium, discussed more fully below with respect to FIG. 4. The optical fiber medium may correspond to a single mode fiber or a multimode fiber. Although the exemplary embodiments discussed herein below process signals transmitted over a single mode fiber, the methods disclosed herein may be easily extended to use a multimode fiber medium by applying the methods to each individual mode.

At step 104, the receiver device may process the signals to determine a transmitted symbol vector sequence by employing super-symbols of a discrete dynamic channel with memory model. As noted above, a super-symbol is a symbol vector with components that are respectively transmitted along different, orthogonal polarization states. In addition, examples of a discrete dynamic channel with memory model include a finite state machine or a trellis description of an optical channel, among others.

To illustrate how multiple symbols may be used as components of a super-symbol, an example is described herein in which the receiver device may operate based on an optical channel model implemented in the form of a discrete dynamical trellis. However, it should be understood that embodiments of the present invention may be implemented using a finite state machine or other models, as understood by those of ordinary skill in the art based on the teachings disclosed herein.

In the example provided herein, the trellis state memory is 2m+1, where m is the number of previous/next symbols influencing the observed symbol. Here, only two polarization states, horizontal and vertical, are used for simplicity purposes. Alternatively, circular right and left polarizations may be used. The transmitted super-symbol sequence and the received sequences are denoted by X and Y, respectively. The super-symbol x∈X has two components $x=(s_H, s_V)$, where $s_H$ and $s_V$ denote the symbols transmitted over horizontal polarization and vertical polarization, respectively. The symbols transmitted over either polarization channel may originate from M-ary QAM, M-ary PSK or M-ary PAM, for example, such that every symbol carries $\log_2 m = b$ bits. The received symbol y∈Y may have four components $y=(\text{Re}(y_H), \text{Im}(y_H), \text{Re}(y_v), \text{Im}(y_v))$, where $\text{Re}(y_H)$ and $\text{Im}(y_H)$ denote the samples corresponding to I- and Q-channels in horizontal polarization, while $\text{Re}(y_v)$ and $\text{Im}(y_v)$ denote the samples corresponding to I- and Q-channels in vertical polarization. $y_j$ is the vector of samples that correspond to the transmitted symbol $x_j$ for the $j^{th}$ discrete time period.

Figure 2:
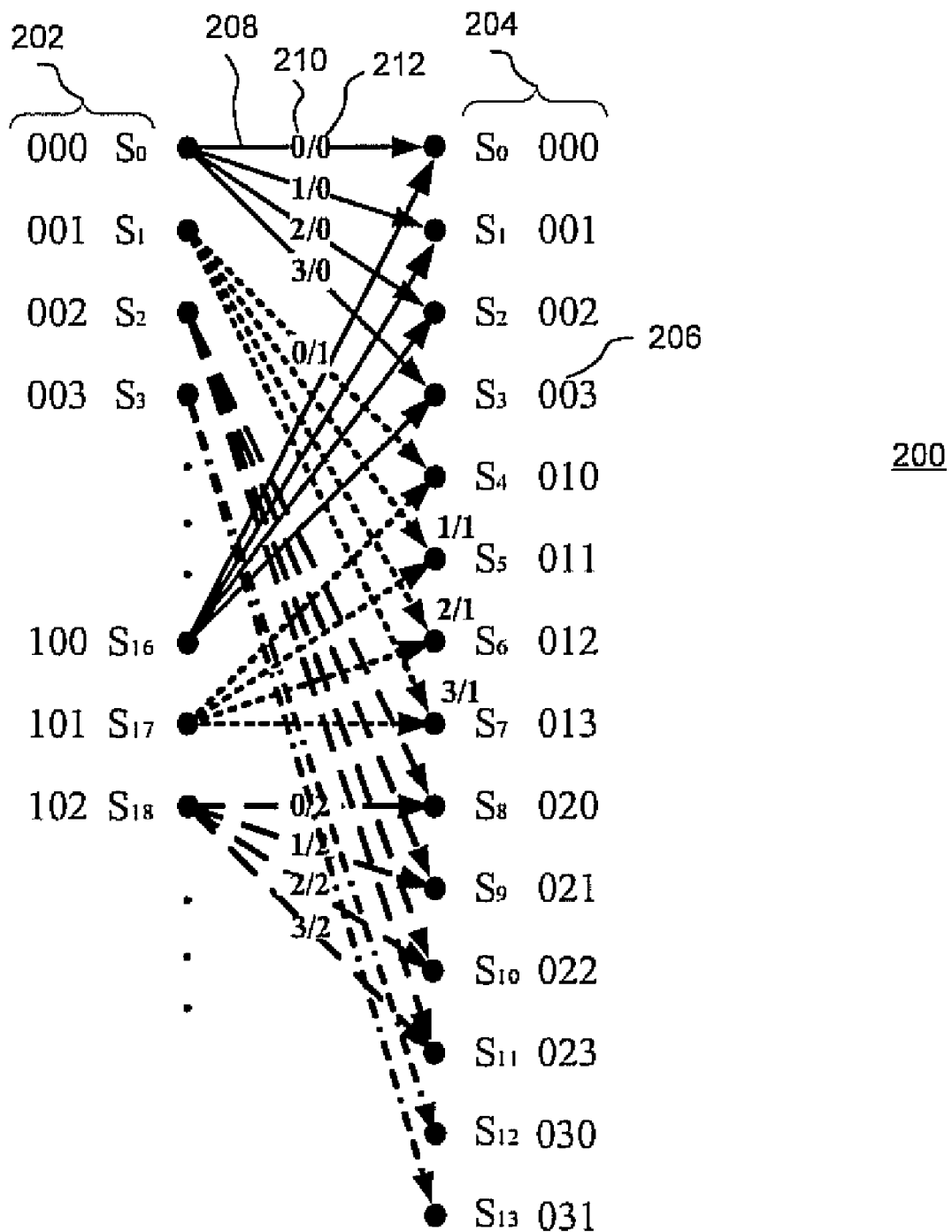
FIG. 2 is a trellis diagram, an example of a discrete dynamic channel with memory model, in accordance with one exemplary embodiment of the present invention.

The memory assumption indicates that a super-symbol $x_i$ is influenced by the preceding m $(x_{i-m}, x_{i-m+1}, \ldots, x_{i-1})$ super-symbols and the next m $(x_{i+1}, \ldots, x_{i+m})$ super-symbols in the sequence. A state is defined as $s=(x_{i-m}, \ldots, x_i, x_{i+1}, \ldots, x_{i+m})$. The trellis is uniquely defined at any moment of time by the triple {previous state, channel output, next state}. FIG. 2 illustrates the 4-level (M=4) trellis 200 for memory 2m+1=3, at time instant j. The quaternary numerical system is used for this example (base 4). The left-column 202 denotes the previous instance of time and the right-column 204 represents the current instance of time. The trellis has $M^{2m+1}=64$ states, each corresponding to the different possible 3-symbol patterns. S denotes the set of all possible states $(s_0, S_1, S_2, \ldots, S_{63})$. The middle super-symbol 206 of the current state indicates the output super-symbol, which is to be detected. The branch arrows 208 indicate possible transitions from a given state in moment in time to the next state. There are two labels above every branch arrows. The first label 210 indicates the transmitted super-symbol and the second label 212 indicates the super-symbol in terminal state.

At step 106, a receiver may determine a transmitted symbol vector sequence from a received symbol vector sequence based on signal processing performed at step 104. For example, as discussed more fully below, the transmitted symbol vector sequence may be determined by calculating symbol vector log-likelihood ratios (LLRs) using conditional probability density functions.

At step, 107 the receiver may determine a bit sequence from the symbol vector sequence determined at step 106. For example, as discussed more fully below, with respect to FIG. 5, the bit sequence may be determined by calculating bit LLRs from symbol vector LLRs.

Many different encoding and decoding processes may employ the trellis scheme to define states and dependencies between states using super-symbols, as discussed above, for purposes of transmitting a bit stream. One example of such a decoding process is described below with respect to FIG. 5. In certain embodiments, the bit sequence at step 107 may correspond to an original information stream. However, additional error correction mechanisms, such as a low-density parity-check (LDPC) coding or turbo-product coding, may optionally be implemented to improve decoding efficiency and accuracy by reducing the effects of PMD or other channel impairments. For example, for LDPC codes, decoding may be implemented using a sum-product algorithm. Alternatively, for turbo-product codes, decoding may be implemented using a Chase II algorithm. Thus, at step 108, the receiver may perform an additional error correction operation to obtain a valid, transmitted bit stream.

Further, another level of error correction may be optionally provided by iterating the processing step 104, the determining step 106, the determining step 107 and/or the performing step 108 using feedback information 109. For example, as discussed more fully below, extrinsic information may be passed between a soft equalizer and a soft decoder until a valid codeword has been obtained or a maximum number of iterations has been reached. Iteration may improve BER performance in accordance with a turbo equalization process, as discussed more fully below.

Optionally, at step 110, the receiver device may determine whether a termination condition was satisfied. For example, the termination condition may correspond reaching a maximum number of iterations or obtaining a valid codeword. If the termination condition is satisfied, then the process may end at step 112 and bits may be output. Otherwise, the extrinsic feedback information 109 may be employed in another iteration of the process.

Figure 3:
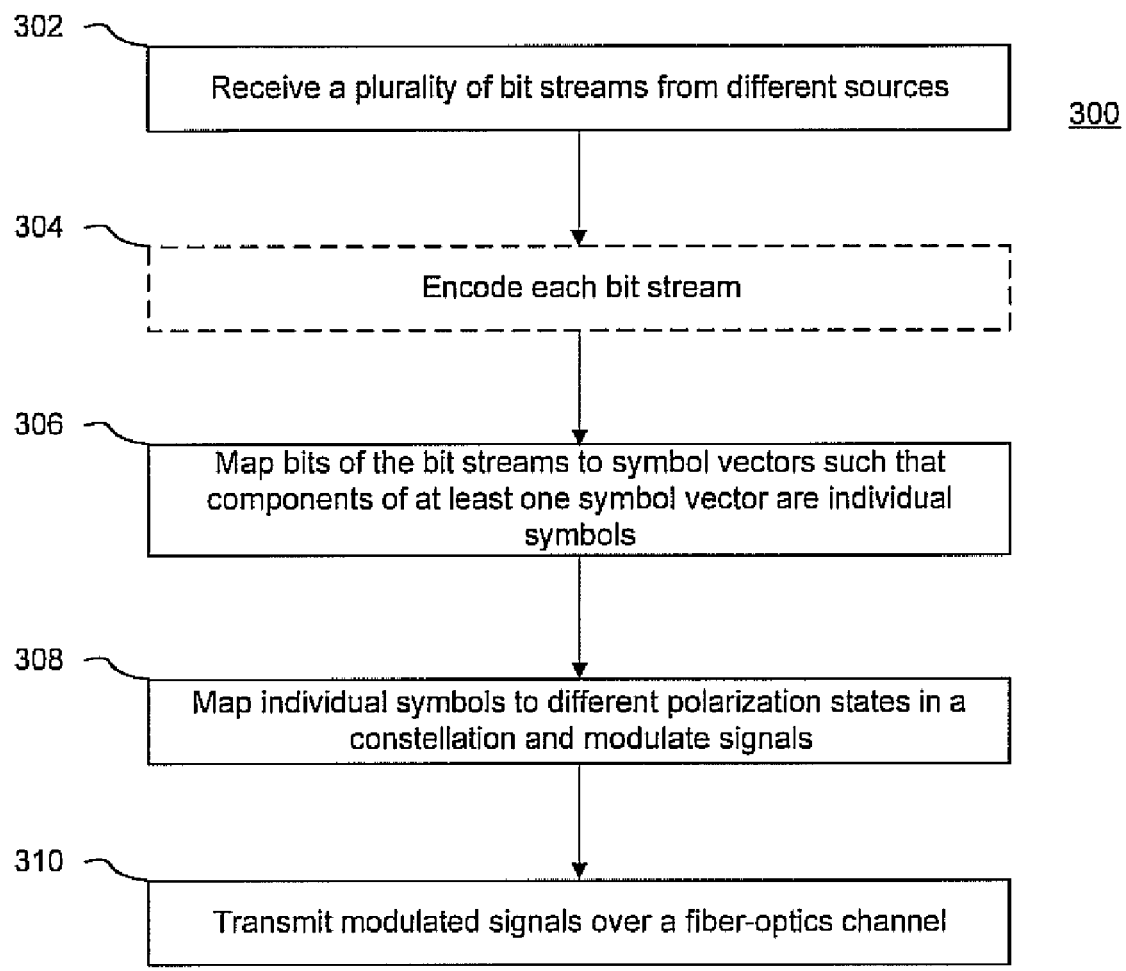
FIG. 3 is a block/flow diagram of a method for transmitting polarization multiplexed multilevel modulated signals in accordance with one exemplary embodiment of the present invention.

Referring now to FIG. 3 with continuing reference to FIG. 1, an exemplary method 300 for transmitting polarization multiplexed multilevel modulated signals that may be received and processed in accordance with method 100 is illustrated. Method 300 may begin at step 302, in which a transmitter device may receive a plurality of bit streams from different sources. Each bit stream may correspond to an original information bit stream.

Optionally, at step 304, each bit stream may be encoded using an additional error correction scheme. The additional error correction operation described above with respect to step 108, for example, may correspond to the additional error correction scheme. The encoded bits may optionally be interleaved in a row-wise fashion, as discussed more fully below with respect to FIG. 4.

At step 306, the transmitter device may map bits of the bit stream to symbol vectors such that components of at least one symbol vector are individual symbols. For example, the bit stream may be encoded in super-symbols x, each of which may include symbol components $s_H$ and $s_V$ transmitted along different polarization states. In addition, mapping may be performed by taking a sequence of bits column-wise as discussed more fully below with respect to FIG. 4.

At step 308, the transmitter device may map the symbol components to different polarization states of a constellation and may modulate signals in accordance with the constellation. The modulation may, for example, be based on phase modulators or dual-drive Mach-Zehnder modulators.

At step 310, the modulated signals may be transmitted over a fiber-optics channel and received by the receiver device discussed above with respect to method 100.

Figure 4:
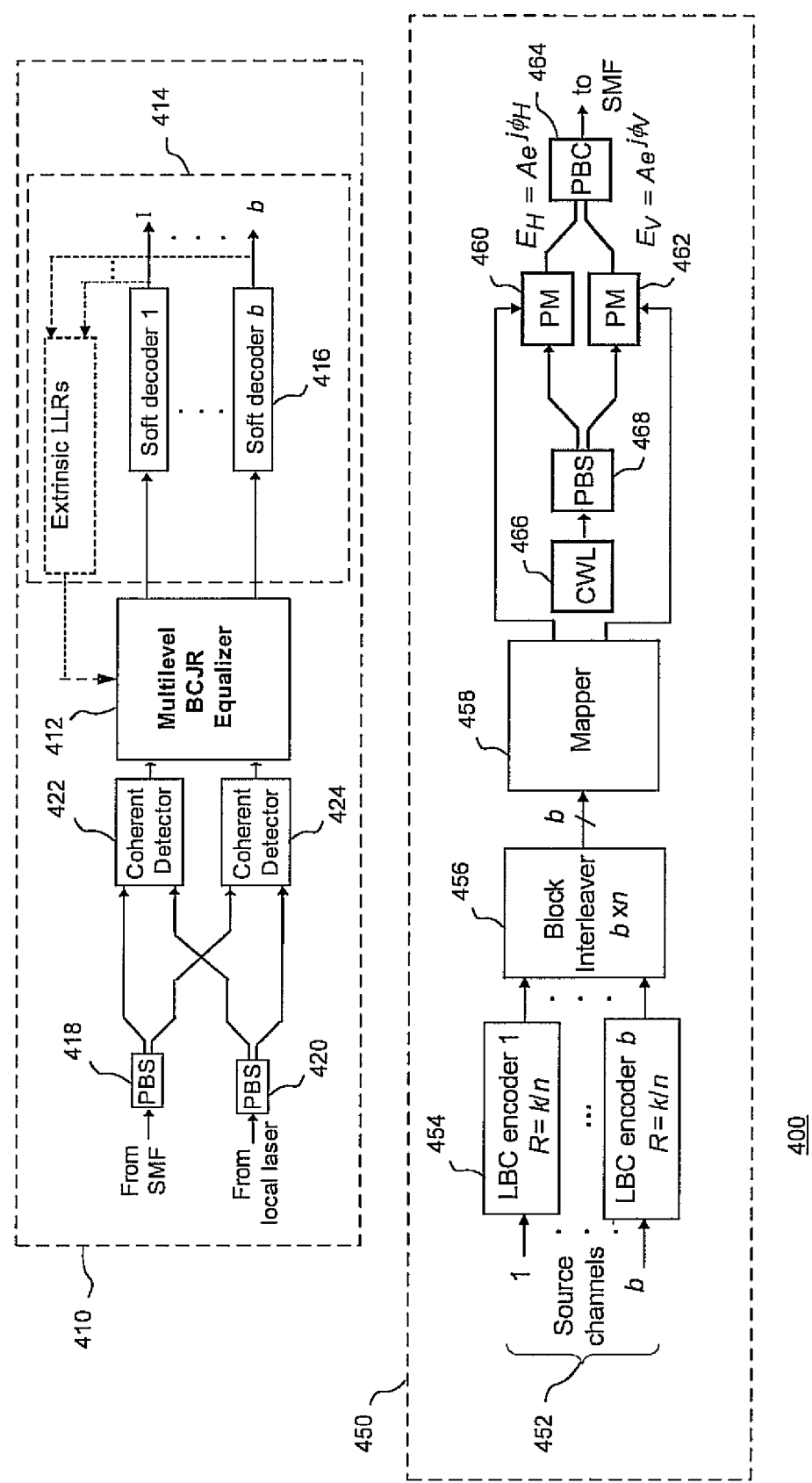
FIG. 4 is a block/flow diagram of a system for transmitting and receiving polarization multiplexed multilevel modulated signals in accordance with one exemplary embodiment of the present invention.
Figure 5:
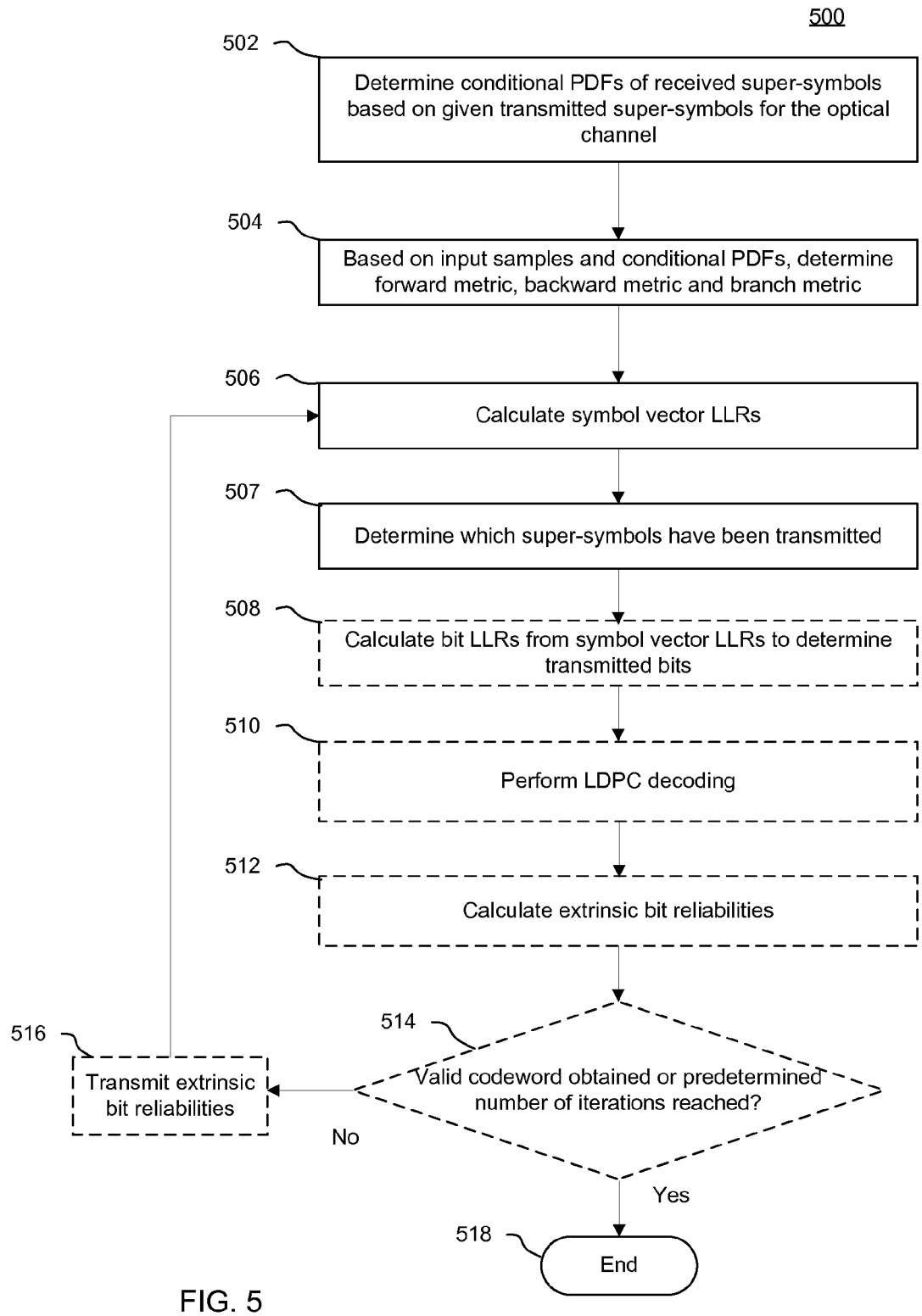
FIG. 5 is a block/flow diagram of a method for detecting polarization multiplexed multilevel modulated signals in accordance with one exemplary embodiment of the present invention.

Turning now to more specific exemplary embodiments of the present invention, reference is made with respect to FIGS. 4 and 5 with continuing reference to FIG. 1. FIG. 4 illustrates a communication system 400 employing super-symbols in accordance with one exemplary embodiment of the present invention. Further, FIG. 5 illustrates a more specific method 500 for detecting polarization multiplexed multilevel modulated signals in accordance with one exemplary embodiment of the present invention. As discussed herein below, several detailed steps of method 500 may be used to implement method 100. In addition, components of system 400 may be configured to perform method 500 and/or method 100.

It should be understood that embodiments described herein may be entirely hardware or including both hardware and software components. For example, in transmitter system 450 elements 454, 456 and 458 can be software modules implemented on hardware. In receiver system 410, elements 412 and 414 can also be software modules implemented on hardware. Alternatively, transmitter system 450 and receiver system 410 can be embodied completely in hardware. In addition, exemplary embodiments of the present invention may be implemented on hardware, such as field-programmable gate array (FPGA) hardware or application-specific integrated circuit (ASIC) hardware.

Returning to FIG. 4, transmission system 400 may comprise a receiver system or device 410 and a transmitter system or device 450, which may implement the receiver and transmitter, respectfully, discussed above with regard to FIGS. 1 and 3. As noted above, elements 412, 414, 454, 456, and 458 of system 400 are either a hardware element or a software module implemented on a hardware element, such as a FPGA/ASIC hardware. As shown in FIG. 4, the receiver system 410 may include a soft equalizer 412 and a soft-iterative decoder system 414 including an array of soft decoders 416. Examples of a soft equalizer include a MAP multi-level equalizer, an equalizer based on a sum-product algorithm approximation or a Monte Carlo equalizer. In the exemplary embodiment discussed herein below, equalizer 412 is a MAP equalizer implemented in accordance with a BCJR scheme. However, as noted above, it should be understood that embodiments of the present invention may be implemented with other soft equalizers by those of ordinary skill in the art in view of the teachings disclosed herein. Further, the soft iterative decoder system may be based on an LDPC coding scheme or a turbo-product coding scheme, as discussed above.

Receiver system 410 may also include polarization beam splitters (PBS) 418, 420 that receive modulated signals from a single mode fiber (SMF) and from a local laser, respectively. The split beams may be transmitted to optical detectors 422, 424, such as coherent detectors, as shown in FIG. 4, which may in turn perform electro-optical conversion to generate input samples from received signals and provide the samples to the BCJR equalizer 412 for further processing. It should be noted that direct detectors may alternatively be used.

With reference to FIG. 5, with continuing reference to FIGS. 1 and 4, the equalizer 412 may be configured to perform steps 502-508. It should be noted here that steps 504-506 are a more specific exemplary implementation of the processing step 104 discussed above, determining step 507 is a more specific exemplary implementation of the determining step 106 discussed above and calculating step 508 is a more specific exemplary implementation of the determining step 107. In addition, in certain exemplary embodiments of the present invention, step 502, described more fully below, may be added to method 100. For simplicity purposes, the exemplary trellis described with respect to FIGS. 1 and 2 are used to illustrate method 500. However, as noted above, other discrete dynamic channel with memory models may be used.

To more completely characterize the optical channel in which the symbols are received, at step 502, the BCJR equalizer 412 may determine the conditional probability density functions (PDFs) of received super-symbols given transmitted super-symbols or symbol vectors, $p(y_j|x_j)=p(y_j|s)$, s∈S for the optical channel. For example, the conditional PDFs may be determined experimentally by pre-transmitting and receiving a sufficiently long training sequence and collecting associated histograms for every output symbol. Alternatively, the PDFs may be determined by applying an instanton-Edgeworth expansion method. Step 502 is a training mode and is omitted in the decision directed mode.

After the training phase of step 502 is completed, at step 504, the BCJR equalizer 412 may calculate forward metrics, backward metrics and branch metrics from input samples received from coherent detectors 422 and 424 and from the PDFs determined in step 502. The forward metric is defined as the probability of the terminal state being s given a received sequence $(y_1, y_2, \ldots, y_j)$. In log-domain the corresponding reliability is given by $\alpha_j(s)=\log[p(s_j=s, [y_1 \ldots y_j])]$, (j=1, 2 ..., n). The backward metric is defined as the conditional probability of receiving the next n-j symbols given the current state. In log-domain the corresponding reliability is defined by $\beta_j(s)=\log[p([y_{j+1} \ldots y_n]|s_j=s]$. The branch metric is defined as the transition probability between two states when a symbol $y_j$ has been received. The corresponding reliability in log-domain is defined by $\gamma_j(s',s)=\log[p(s_j=s,y_j,s_{j-1}=s')]$.

At step 506, the BCJR equalizer 412 may calculate super-symbol or symbol vector LLRs to determine which super-symbols have been transmitted by a transmitter system 450. For example, the metrics discussed above should be calculated for every discrete period of time as given below $$\alpha_j(s) = \max_{s'}{}^* [\alpha_{j-1}(s') + \gamma_j(s', s)], \quad (1)$$

$$\beta_{j-1}(s') = \max_s{}^* [\beta_j(s) + \gamma_j(s', s)]$$

$$\gamma_j(s', s) = \log[p(y_j \mid x[j-m, \ldots, j+m])P(x_j)].$$

The operator max* is defined as max*=max(x,y)+log(1+ $e^{-|x-y|}$). $P(x_j)$ is the a priori probability of a transmitted super-symbol $x_j$. To estimate the super-symbol LLRs, the following relationship may be used by the BCJR equalizer 412:

$$\Lambda(x_j = \delta) = \max_{(s',s):x_j=\delta}{}^* \begin{bmatrix} \alpha_{j-1}(s') + \\ \gamma_j(s', s) + \\ \beta_j(s) \end{bmatrix} - \max_{(s',s):x_j=\delta_0}{}^* \begin{bmatrix} \alpha_{j-1}(s') + \\ \gamma_j(s', s) + \\ \beta_j(s) \end{bmatrix} \quad (2)$$

Here, δ is the candidate output symbol, and the reliability indicates the likelihood of the received super-symbol being a particular transmitted symbol δ. For hard decision forward error correction (FEC) schemes, the decision may be performed based on equation (2) by selecting the super-symbol with largest LLR. In this way, for example, symbol vector LLRs may be used to determine a reliable estimate of the transmitted symbol vector sequence.

Thus, at step 507, the BCJR equalizer 412 may determine which super-symbols have been transmitted. For example, the BCJR equalizer 412 may determine that each symbol vector of the transmitted symbol vector sequence may be a symbol vector with the largest LLR.

It should be noted that the use of reference symbol $\delta_0=x_0$ results in total M−1 symbol reliabilities (instead of M). Moreover, for hard decision decoding, the multilevel BCJR equalizer can be substituted with multilevel soft Viterbi equalizer (MLSE), which is just a forward step of the BCJR equalizer.

At step 508, the BCJR equalizer 412 may calculate corresponding bit LLRs from the symbol vector LLRs to determine transmitted bits. For example, the BCJR equalizer 412 may calculate bit reliabilities in log domain by observing the binary representation of every symbol. Let $c_k$ represent the $k^{th}$ bit in the binary representation of a symbol $x_j$, k=1,2, ..., b. Then the likelihoods for the bit $c_k$ in log domain can be calculated using the already calculated likelihood for all symbols $x_j$ as follows:

$$L(\hat{c}_k) = \log\left[\sum_{x_j:c_k=0} e^{(\Lambda(x_j))}\right] - \log\left[\sum_{x_j:c_k=1} e^{(\Lambda(x_j))}\right] \quad (3)$$

After the bit reliabilities have been calculated, Equalizer 412 may optionally transmit the bit reliabilities to system 414, which, in turn, may optionally perform soft decoding at step 510 based on a sum-product algorithm for LDPC codes or a Chase II algorithm for turbo-product codes, for example, using soft decoders 416. The transmitted bit sequence can be determined based on the sign of LLRs in equation (3). For a negative LLR, a decision may be made in favor of a 0 bit; otherwise it is determined that a 1 bit was transmitted.

It should be noted that step 510 is a more specific exemplary implementation of step 108 in FIG. 1.

As mentioned above, iteration may improve BER performance in accordance with, for example, a turbo equalization process. In an exemplary embodiment of the present invention, extrinsic bit reliabilities may be calculated and used to refine determination of super-symbol LLRs. Thus, optionally, at step 512, the soft decoding system 414 may calculate extrinsic bit LLRs of a soft-decoder, $L_{soft-decoder,ext}(c_k)$. The extrinsic bit LLRs are calculated as the difference between the bit reliabilities of the current and the previous iteration. The extrinsic bit LLRs may be used for improvement of the performance of the multilevel turbo equalizer. For example, these extrinsic bit reliabilities are used to calculate the extrinsic symbol reliabilities, which are used as the a priori reliabilities, for a subsequent iteration as follows:

$$L_{BCJR,apr}(x_j)=\Sigma_{k=0}^{I-1}(1-c_k)L_{soft-decoder,ext}(c_k)= \log[P(x_j)]. \quad (4)$$

Accordingly, to institute the iteration, optionally, at step 514, the soft decoding system 414 may determine whether a valid codeword has been obtained or whether a predetermined number of iterations has been reached. For example, if the soft decoding system 414 uses LDPC codes, the soft decoding system 414 may determine whether all parity check equations for bits obtained from LDPC decoding in step 510 have been satisfied. Step 514 is one exemplary implementation of step 110 discussed above with respect to FIG. 1. If a valid codeword is obtained or if a predetermined number of iterations has been reached, then the method may proceed at step 516 to output the selected bits and process new incoming signals or the method may end at step 518. If a valid codeword has not been obtained or if a predetermined number of iterations has been not been reached, then the extrinsic bit LLRs may be optionally forwarded to the BCJR equalizer 412 to calculate the extrinsic symbol reliabilities, which are used as the a priori reliabilities, as discussed above, during a next iteration of step 506. In this way, the Equalizer 412 and the soft decoding system 414 may respectively pass extrinsic bit LLRs iteratively until a valid codeword is obtained or a predetermined number of iterations has been reached.

Returning now to system 400 of FIG. 4 with reference to FIG. 3, one exemplary embodiment of a transmitter system 450 that may be used to generate polarization multiplexed multilevel modulated signals received by the receiver system 410 in accordance with one exemplary embodiment of the present invention is illustrated. As shown in FIG. 4, the transmitter 450 may receive one or more information bit streams, as described above, for example with respect to step 302. Here, b source bit streams are received from b source channels 452. Optionally, the b source bit streams may be independently encoded using either a turbo-product code or an LDPC code of rate R=k/n, where k is the information word length and n is the codeword length. An arbitrary linear block code (LBC) can be used, as shown in the particular embodiment provided in FIG. 4. Examples include LDPC codes and turbo-product codes. Encoders 454 may be configured to encode the bit streams using the LBC and transmit the encoded streams to a block-interleaver 456, which configures the received bits into a bxn matrix. It should be noted that the encoders 454 and block-interleaver 456 are optional. In addition, it should also be noted that the encoding described here may correspond to the encoding step 304 discussed above with regard to FIG. 3.

At every symbol period time instance, the mapper 458 may accept a vector of b bits from block-interleaver 456 column-wise and may determine the constellation points for transmission, for example, in accordance with steps 306 and 308 discussed above. The mapping may be optimized based on operations conducted in a receiver. The mapper 458 outputs may be used as the modulating signals of the phase modulators (PMs) 460, 462 in accordance with M-ary PSK, for example, with $\phi_1 \in [0, 2\pi/M, \ldots, (M-1)2\pi/M]$, $1 \in \{H, V\}$. To generate the optical signals, a continuous wave laser (CWL) 466 and a polarization beam splitter (PBS) 468 may be employed to generate base optical channels for the PMs 460 and 462. The phase modulated signals may then be combined by the polarization beam combiner (PBC) 464 and transmitted in orthogonal polarizations over the SMF in accordance, for example with step 310 discussed above. However, as noted above, multimode fibers may also be employed in alternative implementations.

Because exemplary embodiments of the present invention discussed herein consider the symbols transmitted across different polarizations as a super-symbol, embodiments of the present invention provide a significant advantage over conventional systems. In contrast to conventional systems, which attempt to separate decisions for x- and y-polarizations and to restore the original orthogonality of symbols transmitted over both polarizations, exemplary embodiments of the present invention may completely eliminate the bit error ratio floor phenomenon. For example, it can be shown that a penalty of less than 1.5 dB at a bit rate of 20 Gb/s for a differential group deal (DGD) of 100 ps may be achieved using embodiments disclosed herein. Furthermore, it can also be shown that exemplary embodiments of the present invention disclosed herein not only provide for an improved polarization mode dispersion compensation, but they also are capable of simultaneous compensation of other fiber optics channel impairments, such as residual chromatic dispersion and fiber nonlinearities.

It should be understood that embodiments described herein may be implemented in both hardware and software, which includes but is not limited to firmware, resident software, microcode, etc. Embodiments may include a computer program product accessible from a computer-usable or computer-readable medium providing program code for use by or in connection with a computer or any instruction execution system. A computer-usable or computer readable medium may include any apparatus that stores the program for use by or in connection with the instruction execution system, apparatus, or device. The medium can be magnetic, optical, electronic, electromagnetic, infrared, or semiconductor system (or apparatus or device). The medium may include a computer-readable medium such as a semiconductor or solid state memory, magnetic tape, a removable computer diskette, a random access memory (RAM), a read-only memory (ROM), a rigid magnetic disk and an optical disk, etc.

Having described preferred embodiments of systems, methods and devices (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for detecting polarization multiplexed multilevel modulated signals comprising:
    receiving the signals from an optical fiber medium;
    processing the signals with a soft equalizer by employing symbol vectors of a discrete dynamic channel with memory model, wherein two orthogonal components of at least one symbol vector are symbols that are respectively transmitted over different polarization states; and
    determining a transmitted symbol vector sequence from a received symbol vector sequence based on said processing.

2. The method of claim 1, wherein the discrete dynamic channel with memory model is a finite state machine or a trellis description of an optical channel and wherein said symbol vectors are components of state vectors of the discrete dynamic channel with memory model.

3. The method of claim 2, further comprising:
    determining conditional probability density functions of received symbol vectors based on given transmitted symbol vectors for the optical channel over which the signals are transmitted.

4. The method of claim 1, wherein the soft equalizer is a maximum a posteriori probability (MAP) multilevel equalizer, an equalizer based on a sum-product algorithm approximation or a Monte Carlo equalizer.

5. The method of claim 1, wherein the processing further comprises:
    determining a forward metric, a backward metric and a branch metric for received symbol vectors.

6. The method of claim 5, wherein the processing further comprises:
    calculating symbol vector log-likelihood ratios (LLRs) to determine the transmitted symbol vector sequence.

7. The method of claim 6, further comprising:
calculating bit LLRs from the symbol vector LLRs for use in an additional error correction decoding operation.

8. The method of claim 7, wherein the additional error correction decoding operation is based on a low-density parity-check (LDPC) decoding scheme or a Chase II decoding scheme, and the method further comprises:
performing the additional error correction decoding operation.

9. The method of claim 8, further comprising:
calculating extrinsic bit reliabilities to determine extrinsic symbol vector LLRs.

10. The method of claim 9, further comprising;
repeating said processing, determining, calculating bit LLRs, performing decoding and calculating extrinsic bit reliabilities until valid codewords are obtained or a pre-determined number of iterations has been reached.

11. A system for transmitting polarization multiplexed multilevel modulated signals comprising:
a transmitter configured to receive a bit stream, to map bits to symbol vectors, each symbol vector including two orthogonal component symbols, and to transmit said component symbols over different, respective polarization states of modulated signals over an optical fiber medium; and
a receiver configured to receive and process the signals in accordance with a soft equalization scheme by employing a discrete dynamic channel with memory model, which utilizes said symbol vectors, to determine a transmitted symbol vector sequence and thereby obtain the bit stream.

12. The system of claim 11, wherein the dynamic channel with memory model is a finite state machine or a trellis description of an optical channel and wherein said symbol vectors are components of state vectors of the discrete dynamic channel with memory model.

13. The system of claim 12, wherein the receiver further comprises a soft equalizer that is a maximum a posteriori probability (MAP) multilevel equalizer, an equalizer based on a sum-product algorithm approximation or a Monte Carlo equalizer.

14. The system of claim 13, wherein the soft equalizer is a MAP multilevel equalizer that is based on a Bahl-Cocke-Jelinek-Raviv (BCJR) analyzer and is configured to operate on conditional probability density functions of received symbol vectors determined from given transmitted symbol vectors for the optical channel over which the signals are transmitted.

15. The system of claim 14, wherein the MAP multilevel equalizer is further configured to determine a forward metric, a backward metric and a branch metric for received symbol vectors.

16. The system of claim 15, wherein the MAP multilevel equalizer is further configured to calculate symbol vector log-likelihood ratios (LLRs) to determine a reliable estimate of the transmitted symbol vector sequence.

17. The system of claim 16, wherein the MAP multilevel equalizer is further configured to calculate bit LLRs from the symbol vector LLRs for use in an additional error correction decoding operation.

18. The system of claim 17, wherein the receiver further comprises:
a soft decoder that is either a low-density parity-check (LDPC) decoder or a Chase II decoder, wherein the soft decoder is configured to receive said bit LLRS, perform soft decoding and calculate extrinsic bit reliabilities and the MAP multilevel equalizer is further configured to determine extrinsic symbol vector LLRs from the extrinsic bit reliabilities.

19. The system of claim 18, wherein the MAP multilevel equalizer and the soft decoder are configured to repeatedly determine extrinsic symbol vector LLRs and extrinsic bit reliabilities, respectively, until valid codewords are obtained or a pre-determined number of iterations has been reached.

20. A receiver device for processing polarization multiplexed multilevel modulated signals received on an optical fiber medium comprising:
at least one optical detector configured to perform electro-optical conversion and generate input samples from said signals; and
a soft equalizer configured to process said input samples by employing symbol vectors of a discrete dynamic channel with memory model, wherein two orthogonal components of at least one symbol vector are symbols that are respectively transmitted over different polarization states and configured to determine a transmitted symbol vector sequence from a received symbol vector sequence based on said processing.

* * * * *